Nov. 27, 1928.
G. W. TAYLOR
1,693,412
SAFETY DEVICE FOR PASSENGER COACHES AND OTHER VEHICLES
Filed Oct. 29, 1927
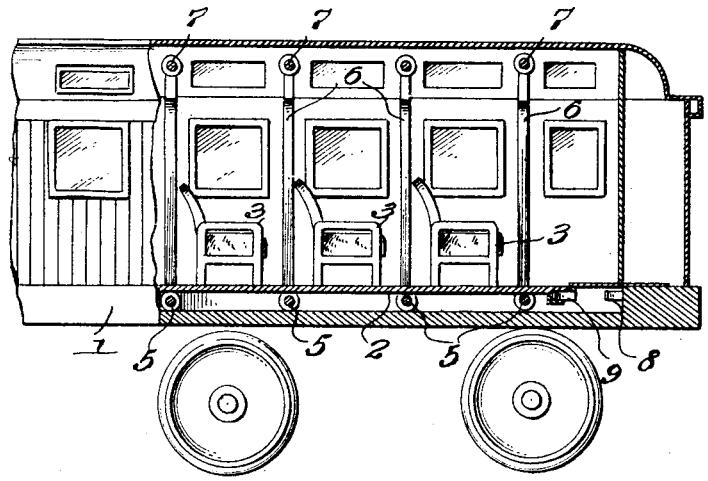
Fig. 1.
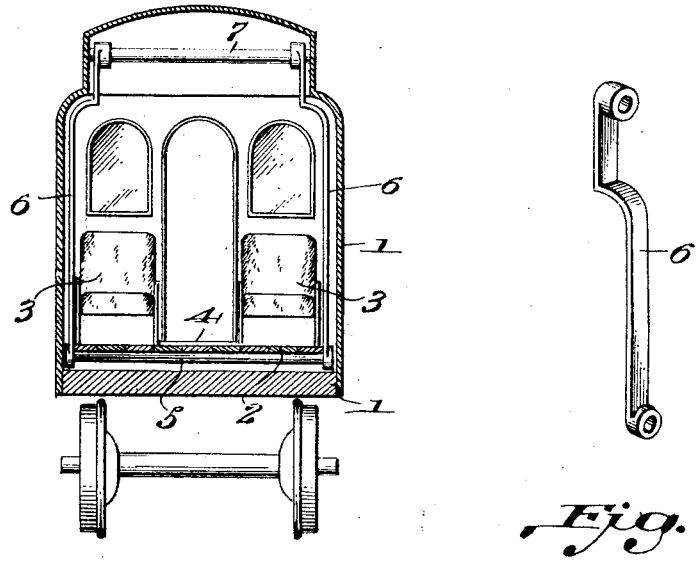
Fig. 2.
Fig. 3.
Inventor,
George Washington Taylor
By
Atty.

Patented Nov. 27, 1928.

1,693,412

UNITED STATES PATENT OFFICE.

GEORGE WASHINGTON TAYLOR, OF EVANSVILLE, INDIANA.

SAFETY DEVICE FOR PASSENGER COACHES AND OTHER VEHICLES.

Application filed October 29, 1927. Serial No 229,649.

The object of this invention is to provide improvements in passenger coaches, automobiles, busses, and other land vehicles whereby sudden stops or sudden checking of the vehicle will be compensated for to minimize the tendency of passengers, train men and others carried by the vehicle to be suddenly thrown forward and injured.

While the invention is particularly adapted for use on land vehicles, it is also adapted for use on boats, ships, and other water vehicles.

The invention is carried out by providing an improved suspended supplemental mounting or support for that part of the vehicle which is occupied by passengers, train men, and others, such support being free to have a swinging movement in relation to the vehicle so that it will swing when the vehicle is checked or suddenly stopped while traveling, thus almost entirely absorbing the shock and minimizing its effect on the occupants of the vehicle.

Bumper or cushion means is also provided to further assist in the cushioning action.

As shown in the accompanying drawings, the seats for the passengers and the aisle for the train men are carried by a platform which is suitably suspended or hung so that it may swing relatively to the vehicle but it is within the spirit of the invention to individually mount or support the seats either independently or in groups.

One embodiment of the invention is shown in the accompanying drawings in which:

Figure 1, is a longitudinal section through a passenger coach, showing some of the seats and their mounting;

Fig. 2, is a cross section therethrough showing the manner of suspending the platform; and Fig. 3, is a detail view of one of the hangers.

The coach is shown at 1. Instead of having the floor of the coach permanently connected to the sills, it is movable in relation thereto in the direction of the length of the car, said floor being shown at 2 and comprising the support for the seats 3 and the aisle or passage-way 4.

It is within the spirit of my invention to have all of the seats 3 mounted on a single floor 2, or, to have the seats mounted independently or in groups so that they may shift in the direction of the length of the car when the car is suddenly stopped or its movement is abruptly checked. As shown, all of the seats, from one end of the car to the other end thereof are carried by the floor or platform 2 to which they are rigidly connected.

Any suitable means may be employed for supporting or suspending the platform or floor 2. As shown, the floor 2 is supported by cross rods 5 connected to hangers 6 which are suspended from cross rods 7. Any suitable means may be resorted to for substantially concealing the hangers 6 and the cross rods 7 so that the appearance of the interior of the car will not be marred.

To cushion the movement of the seats and the floor or platform, any suitable bumper or cushion may be provided. As shown, there is provided at each end of the car 1 a bumper of rubber or of springs 8 and on each end of the platform 2 is a bumper or cushion of rubber or springs 9 adapted to co-operate with the bumper 8.

When the vehicle is abruptly checked or an emergency stop is made the inertia causes the platform 2 and the seats 3 to move, inasmuch as the hangers 6 suspend the platform and seats. The bumpers 8, 9 cushion the action at both ends of the platform 2. Instead of an abrupt stop tending to throw the passengers and train men forward, with possibility of injury and even death, the shock is absorbed and the passengers and train men are subject to only a slight jar.

Other means than those illustrated may be provided to carry out the object of the invention and, except where so stated in the claims, I do not limit myself to the specific embodiment described and shown in the drawings.

What I claim is:

1. In a safety device for passenger coaches and other vehicles, the combination with an enclosing coach body, of hangers located inside of the coach-body at the sides of the vehicle, a movable platform suspended by said hangers and having a passage-way or aisle and provided with seats for passengers, said hangers being adapted to swing and the platform to shift inside of, and in relation to, the enclosing coach-body in the direction of the length of the vehicle when the movement of the vehicle is arrested.

2. In a safety device for passenger coaches and other vehicles, the combination with an enclosing coach-body, of hangers located inside of the coach-body at the sides of the vehicle, a movable platform suspended by said hangers and having a passage-way or aisle and provided with seats for passengers, said hangers being adapted to swing and the platform to shift inside of, and in relation to, the enclosing coach-body in the direction of the length of the vehicle when the movement of the vehicle is arrested, and bumpers on the ends of the coach-body and ends of the platform for cushioning the movement of said platform in both directions.

3. In a safety device for passenger coaches and other vehicles, the combination with an enclosing coach-body, of hangers located inside the coach-body at the sides of the vehicle, and passenger seats suspended by said hangers, there being a passage-way or aisle between said seats.

In testimony whereof I affix my signature.

GEORGE WASHINGTON TAYLOR.